(12) United States Patent
Honda

(10) Patent No.: US 11,241,917 B2
(45) Date of Patent: Feb. 8, 2022

(54) PNEUMATIC TIRE

(71) Applicant: The Yokohama Rubber Co., LTD., Tokyo (JP)

(72) Inventor: Naruhiko Honda, Hiratsuka (JP)

(73) Assignee: The Yokohama Rubber Co., LTD.

( * ) Notice: Subject to any disclaimer, the term of this patent is extended or adjusted under 35 U.S.C. 154(b) by 273 days.

(21) Appl. No.: 15/778,620

(22) PCT Filed: Nov. 25, 2016

(86) PCT No.: PCT/JP2016/084932
§ 371 (c)(1),
(2) Date: May 23, 2018

(87) PCT Pub. No.: WO2017/090715
PCT Pub. Date: Jun. 1, 2017

(65) Prior Publication Data
US 2018/0354309 A1 Dec. 13, 2018

(30) Foreign Application Priority Data

Nov. 27, 2015 (JP) .............................. JP2015-231722

(51) Int. Cl.
*B60C 11/03* (2006.01)
*B60C 11/12* (2006.01)
*B60C 11/13* (2006.01)

(52) U.S. Cl.
CPC .......... *B60C 11/0306* (2013.01); *B60C 11/03* (2013.01); *B60C 11/0302* (2013.01);
(Continued)

(58) Field of Classification Search
CPC ......... B60C 11/0302; B60C 2011/0369; B60C 2011/0381; B60C 2011/0383; B60C 11/12
See application file for complete search history.

(56) References Cited

U.S. PATENT DOCUMENTS 5,435,364 A * 7/1995 Hasegawa ........... B60C 11/0302
152/209.18
2010/0206446 A1 8/2010 Oizumi
(Continued)

FOREIGN PATENT DOCUMENTS

JP 60-169305 A * 9/1985
JP 09-226323 A * 9/1997
(Continued)

OTHER PUBLICATIONS

Machine translation for Japan 2010-167930 (Year: 2020).*
(Continued)

*Primary Examiner* — Steven D Maki
(74) *Attorney, Agent, or Firm* — Thorpe North & Western

(57) ABSTRACT

A pneumatic tire, includes: an annular-shape tread portion; a sidewall portions; and bead portions. JIS hardness of tread rubber is within a range of 40 to 60 and snow traction index is 180 or higher. A rib positioned between circumferential grooves is demarcated in a center region of the tread portion. Closed grooves are formed in the rib. The closed grooves are inclined with regard to a tire axial direction such that a closed end faces a leading side. A groove wall of the closed groove on the leading side protrudes more outward in the tire axial direction than a groove wall on a trailing side. A difference between angles θ1 and θ2 of the groove walls on the leading and trailing sides of the closed grooves, respectively, with regard to the tire axial direction is within a range of $0° \leq \theta_1 - \theta_2 \leq 5°$.

11 Claims, 5 Drawing Sheets

(52) U.S. Cl.
CPC .......... *B60C 11/0316* (2013.01); *B60C 11/12* (2013.01); *B60C 11/1218* (2013.01); *B60C 11/1259* (2013.01); *B60C 11/13* (2013.01); *B60C 11/1307* (2013.01); *B60C 11/1323* (2013.01); *B60C 2011/0313* (2013.01); *B60C 2011/0346* (2013.01); *B60C 2011/0358* (2013.01); *B60C 2011/0369* (2013.01); *B60C 2011/0372* (2013.01); *B60C 2011/0383* (2013.01); *B60C 2011/0388* (2013.01); *B60C 2011/129* (2013.01)

(56) References Cited

U.S. PATENT DOCUMENTS

| | | | | |
|---|---|---|---|---|
| 2010/0252159 | A1* | 10/2010 | Mukai | B60C 11/1369 152/209.25 |
| 2011/0192514 | A1 | 8/2011 | Ochi et al. | |
| 2011/0308680 | A1* | 12/2011 | Numata | B60C 11/0318 152/209.17 |
| 2013/0146192 | A1* | 6/2013 | Miyoshi | B60C 11/0302 152/209.25 |
| 2016/0144666 | A1 | 5/2016 | Yoshida | |
| 2016/0229231 | A1* | 8/2016 | Furusawa | B60C 11/0302 |

FOREIGN PATENT DOCUMENTS

| | | |
|---|---|---|
| JP | 2005-047397 | 2/2005 |
| JP | 2009-120055 | 6/2009 |
| JP | 2009-274669 | 11/2009 |
| JP | 4471031 | 6/2010 |
| JP | 2010-167930 | 8/2010 |
| JP | 2010-167930 A * | 8/2010 |
| JP | 5102711 | 12/2012 |
| JP | 2013-018309 | 1/2013 |
| JP | 2013-119306 | 6/2013 |
| JP | 2014-108653 | 6/2014 |
| JP | 2014-189037 | 10/2014 |
| JP | 2015-020465 | 2/2015 |
| JP | 2015-101211 | 6/2015 |
| WO | WO 2010/007996 | 1/2010 |
| WO | WO 2015/008659 | 1/2015 |
| WO | WO 2015/041179 | 3/2015 |
| WO | WO-2015/041179 A1 * | 3/2015 |

OTHER PUBLICATIONS

Machine translation for Japan 09-226323 (Year: 2020).*
Machine translation for Japan 60-169305 (Year: 2020).*
International Search Report for International Application No. PCT/JP2016/084932 dated Feb. 28, 2017, 4 pages, Japan.

* cited by examiner

PNEUMATIC TIRE

TECHNICAL FIELD

The present technology relates to a pneumatic tire, and particularly relates to a pneumatic tire that can increase a snow column shear force and can effectively improve performance on snow.

BACKGROUND ART

In pneumatic tires for use on icy and snowy roads as represented by studless tires, a plurality of circumferential groove extending in a tire circumferential direction and a plurality of lug grooves extending in a tire width direction are formed on a tread portion, and a rib continuously extending along the tire circumferential direction or a plurality of blocks subdivided along the tire circumferential direction are demarcated by the circumferential grooves and lug grooves. Furthermore, a plurality of sipes are formed on the ribs and blocks, and thus performance on ice and performance on snow is enhanced by an edge effect of the sipes (for example, refer to Japanese Unexamined Patent Publication Nos. 2005-47397, 2009-120055, 2013-18309 and Japanese Patent Nos. 4471031 and 5102711).

A pneumatic tire for use on icy and snowy roads configured in such a manner generates a driving force and braking force when traveling on snow based on a snow column shear force formed inside a groove when snow becomes packed down. Therefore, increasing the snow column shear force produced when traveling on snow is effective for improving performance on snow. In general, a groove depth, groove width, or groove area in the tread portion is increased such that the snow column shear force is increased.

However, when considering tire performance other than performance on snow, the groove depth, groove width, or groove area naturally have limitations, and therefore, there is a limit to the improvement in performance on snow based on these factors.

SUMMARY

The present technology provides a pneumatic tire that can increase a snow column shear force and can effectively improve performance on snow.

A pneumatic tire includes: an annular-shape tread portion extending in a tire circumferential direction; a pair of sidewall portions disposed on both sides of the tread portion; and a pair of bead portions disposed on an inner side in a tire radial direction of the sidewall portion; JIS (Japanese Industrial Standard) hardness of tread rubber configuring the tread portion being within a range of 40 to 60, snow traction index based on grooves and sipes formed on the tread portion being 180 or higher, and a rotation direction being specified; wherein a rib positioned between a pair of circumferential grooves and continuous in the tire circumferential direction is demarcated in a center region of the tread portion, a plurality of closed grooves with a first end closed inside the rib and a second end opening in one of the circumferential grooves are formed in the rib, the closed grooves are inclined with regard to a tire axial direction such that closed ends thereof face a leading side, a groove wall of the closed groove on the leading side protrudes more outward in the tire axial direction than a groove wall on a trailing side, and a difference between an angle $\theta 1$ of the groove walls on the leading side of the closed grooves with regard to the tire axial direction and an angle $\theta 2$ of the groove walls on the trailing side with regard to the tire axial direction is within a range of $0° \le \theta 1 - \theta 2 \le 5°$.

With the present technology, in a pneumatic tire where a rotation direction is specified, a rib is provided in a center region of a tread portion, a plurality of closed grooves are formed in the rib, the closed grooves are inclined with regard to a tire axial direction such that closed ends thereof face a leading side, groove walls on the leading side of the closed grooves protrude more to the outside in the tire axial direction than the groove walls on a trailing side, and a difference between the angle $\theta 1$ of the groove walls on the leading side of the closed grooves with regard to the tire axial direction and angle $\theta 2$ of the groove walls on the trailing side of the closed grooves with regard to the tire axial direction is set within a range of $0° \le \theta 1 - \theta 2 \le 5°$, and therefore, the closed grooves are closed based on slippage occurring between the tread portion and road surface when driving and a snow column is compressed inside the closed grooves, and the closed grooves are closed based on slippage occurring between the tread portion and road surface when braking such that a large amount of snow is introduced into the closed grooves. Thus, a shear force of a snow column formed inside the closed groove is increased, and therefore, a driving force and braking force during travel on snow increases based on the snow column shear force, and thus performance on snow can be effectively improved.

In the present technology, a ratio W/D of the groove width W with regard to a groove depth D of the closed groove is preferably within a range of 0.10 to 0.30. Thus, the closed grooves appropriately deform in a ground contacting condition, and as a result, the closed grooves easily close when driving, and a sufficient amount of snow is introduced in the closed groove when braking, and therefore, performance on snow can be effectively improved.

A protruding amount E of the groove wall on the leading side of the closed groove is preferably within a range of 5% to 15% of a width Wr in the tire axial direction of the rib. Thus, a sufficient amount of snow is introduced in the closed groove when braking, and therefore, performance on snow can be effectively improved.

An angle $\theta$ of a center line of the closed groove with regard to the tire axial direction is preferably within a range of 25° to 65°. Thus, a sufficient amount of snow is introduced in the closed groove when braking, and therefore, performance on snow can be effectively improved.

The closed groove preferably has a structure that gradually deepens toward the closed end thereof. Thus, a volume of the closed groove on a closed end side is relatively increased, and an effect of guiding snow to the closed end side of the closed groove is increased, and therefore, the snow column shear force can be increased.

A length Wg of the closed groove in the tire axial direction is preferably within a range of 40% to 80% of the width Wr of the rib in the tire axial direction. Thus, the snow column shear force based on the closed groove is sufficiently ensured, and thus performance on snow can be effectively improved.

In the present technology, a JIS hardness is durometer hardness measured in accordance with JIS K-6253 using a type A durometer at a temperature of 20° C.

Furthermore, in the present technology, a snow traction index STI is calculated by the following equation (1).

$$STI = -6.8 + 2202\rho g + 672\rho s + 7.6 \, Dg \quad (1)$$

However, ρg: Groove density (mm/mm²)=Overall length (mm) of extending component of groove in tire width direction/Overall area (mm²) of ground contact region ρs: Sipe density (mm/mm²)=Overall length (mm) of extending component of sipe in tire width direction/Overall area (mm²) of ground contact region Dg: Average groove depth (mm)

The ground contact region of the tread portion is a region specified based on a ground contact width in the tire axial direction as measured when the tire is mounted on a regular rim and inflated to a regular internal pressure, and placed orthogonally on a flat surface with a regular load applied thereto. "Regular rim" is a rim defined by a standard for each tire according to a system of standards that includes standards on which tires are based, and refers to a "standard rim" in the case of Japan Automobile Tyre Manufacturers Association (JATMA), refers to a "design rim" in the case of Tire and Rim Association (TRA), and refers to a "measuring rim" in the case of European Tyre and Rim Technical Organisation (ETRTO). "Regular internal pressure" is the air pressure defined by standards for each tire according to a system of standards that includes standards on which tires are based, and refers to a "maximum air pressure" in the case of JATMA, refers to the maximum value in the table of "TIRE ROAD LIMITS AT VARIOUS COLD INFLATION PRESSURES" in the case of TRA, and refers to the "INFLATION PRESSURE" in the case of ETRTO. "Regular internal pressure" is 180 kPa for a tire on a passenger vehicle. "Regular load" is a load defined by a standard for each tire according to a system of standards that includes standards on which tires are based, and refers to a "maximum load capacity" in the case of JATMA, to the maximum value in the table of "TIRE ROAD LIMITS AT VARIOUS COLD INFLATION PRESSURES" in the case of TRA, and to "LOAD CAPACITY" in the case of ETRTO. "Regular load" corresponds to 88% of the loads described above for a tire on a passenger vehicle.

BRIEF DESCRIPTION OF DRAWINGS

FIG. 4 illustrates a rib of the pneumatic tire in FIG. 1, where

DETAILED DESCRIPTION

The configuration of the present technology is described in detail below with reference to the accompanying drawings. FIGS. 1 to 6 illustrate a pneumatic tire according to an embodiment of the present technology. The pneumatic tire of the present embodiment is a tire where a rotation direction R is specified. In FIG. 2, CL represents a tire equator, and E represents a ground contacting end.

Figure 1:
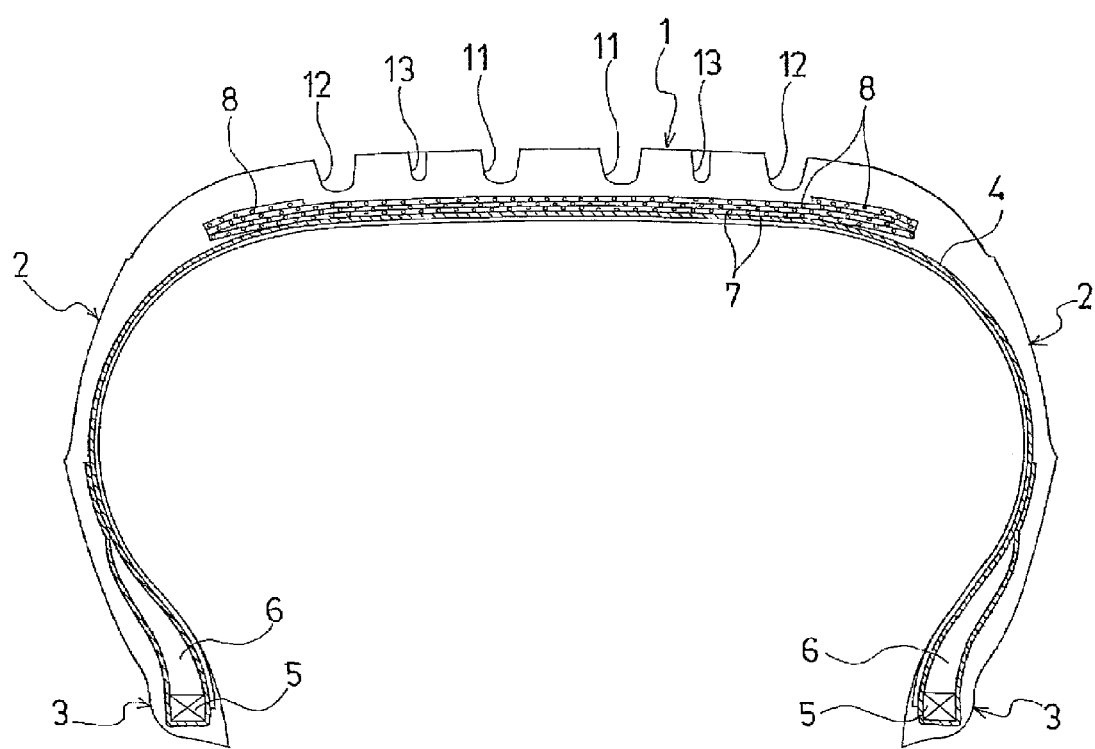
FIG. 1 is a meridian cross-sectional view illustrating a pneumatic tire according to an embodiment of the present technology.
Figure 2:
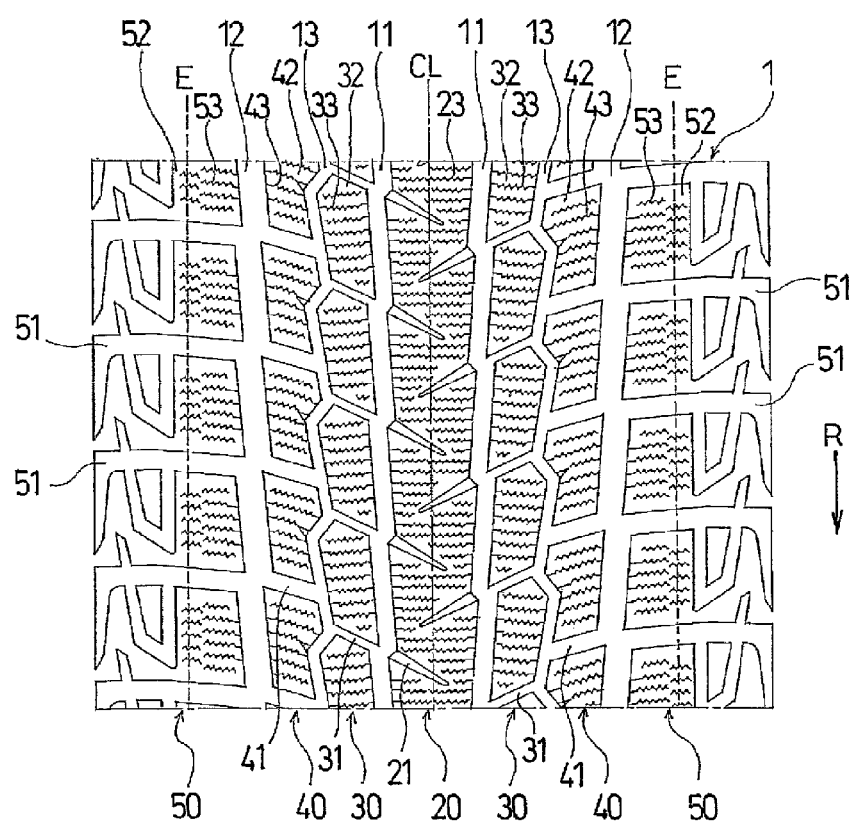
FIG. 2 is a developed view illustrating a tread pattern of the pneumatic tire in FIG. 1.

As illustrated in FIG. 1, a pneumatic tire of the present embodiment includes an annular tread portion 1 extending in a tire circumferential direction, a pair of sidewall portions 2, 2 disposed on both sides of the tread portion 1, and a pair of bead portions 3, 3 disposed on an inner side of the sidewall portions 2 in a tire radial direction.

A carcass layer 4 is mounted between the pair of bead portions 3,3. The carcass layer 4 includes a plurality of reinforcing cords extending in the tire radial direction and is folded back around bead cores 5 disposed the bead portions 3 from a tire inner side to a tire outer side. A bead filler 6 having a triangular cross-sectional shape formed from a rubber composition is disposed on an outer circumference of the bead core 5.

On the other hand, a plurality of belt layers 7 are embedded on an outer circumferential side of the carcass layer 4 in the tread portion 1. The belt layers 7 include a plurality of reinforcing cords that are inclined with regard to the tire circumferential direction, and are disposed such that the reinforcing cords mutually intersect between layers. In the belt layers 7, an inclination angle of the reinforcing cords with regard to the tire circumferential direction range is set within a range of 10° to 40°, for example. A steel cord is preferably used as the reinforcing cord of the belt layer 7. In order to improve high-speed durability, at least one belt cover layer 8 formed by arranging the reinforcing cords at an angle of 5° or less for example with regard to the tire circumferential direction is disposed on the outer circumferential side of the belt layers 7. A nylon, aramid, or other organic fiber cord is preferably used as the reinforcing cord of the belt cover layer 8.

Note that the aforementioned tire internal structure indicates a representative example of the pneumatic tire, and is not limited thereto.

As illustrated in FIG. 2, a pair of circumferential main grooves 11 that extend in a zigzagging shape along the tire circumferential direction on both sides of the tire equator CL, a pair of circumferential main grooves 12 extending in a zigzagging shape along the tire circumferential direction on an outer side in the tire width direction of the circumferential main grooves 11, and a pair of circumferential auxiliary grooves 13 extending in a zigzagging shape along the tire circumferential direction between the circumferential main grooves 11 and circumferential main grooves 12 are formed on the tread portion 1. The circumferential main grooves 11, 12 are grooves with groove widths within a range of 7 mm to 14 mm, and groove depths within a range of 8.0 mm to 12.0 mm. On the other hand, the circumferential auxiliary grooves 13 are grooves that are narrower than the circumferential main grooves 11, 12, with groove widths within a range of 3 mm to 7 mm, and groove depths within a range of 7.0 mm to 11.0 mm.

In the tread portion 1, a center rib 20 is demarcated between the pair of circumferential main grooves 11, 11, an middle block row 30 is demarcated between the circumferential main grooves 11 and circumferential auxiliary grooves 13, a middle block row 40 is demarcated between the circumferential auxiliary grooves 13 and circumferential main grooves 12, and a shoulder block row 50 is demarcated on an outer side in the tire width direction of the circumferential main grooves 12.

Figure 3:
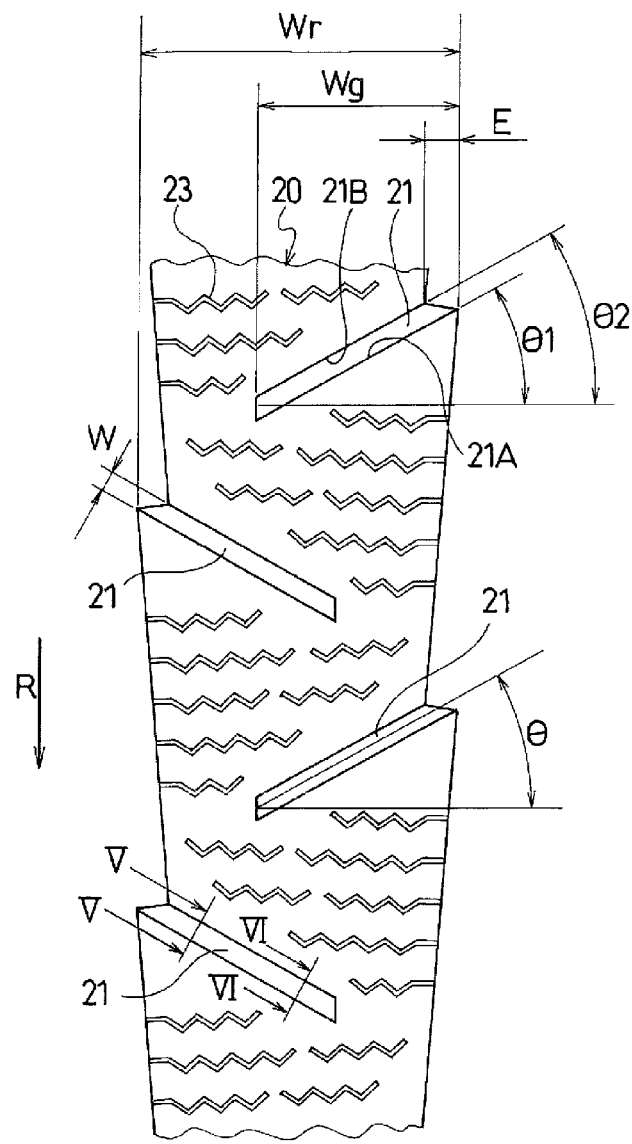
FIG. 3 is a plan view illustrating a rib formed in a center region of a tread portion in the pneumatic tire in FIG. 1.

As illustrated in FIG. 3, a plurality of closed grooves 21 with a first end closing in the center rib 20 and a second end opening in one of the circumferential main grooves 11, and a plurality of sipes 23 extending in the tire axial direction are formed on the center rib 20. The plurality of closed grooves 21 include grooves that open on a first side in the tire axial direction and grooves that open on a second side in the tire axial direction, and are alternatingly disposed along the tire circumferential direction. Herein, the leading side of the center rib 20 is the same side in the rotation direction R, and the trailing side is the opposite side in the rotation direction R. The closed grooves 21 are inclined in the tire axial direction such that closed ends thereof face the leading side (in other words, the rotation direction R side). Groove walls 21A on the leading side of the closed grooves 21 protrude more outward in the tire axial direction than groove walls 21B on the trailing side. Furthermore, a difference between an angle $\theta1$ of the groove walls 21A on the leading side of the closed grooves 21 with regard to the tire axial direction and angle $\theta2$ of the groove walls 21B on the trailing side with regard to the tire axial direction is set within a range of $0° \leq \theta1-\theta2 \leq 5°$. In other words, the closed grooves 21 have a structure where the groove walls 21A on the leading side and groove walls 21B on the trailing side are mutually parallel, or the groove walls 21A on the leading side and groove walls 21B on the trailing side gradually approach each other toward an opening end side.

A plurality of lug grooves 31 extending in the tire axial direction are formed on the middle block row 30, and a plurality of blocks 32 are formed by the lug grooves 31. A plurality of lug grooves 41 extending in the tire axial direction are formed on the middle block row 40, and a plurality of blocks 42 are formed by the lug grooves 41. A plurality of lug grooves 51 extending in the tire axial direction are formed on the shoulder block row 50, and a plurality of blocks 52 are formed by the lug grooves 51. The lug grooves 31, 41, 51 are all disposed so as to be inclined from the outer side in the tire axial direction to the inner side toward the rotation direction R side. Furthermore, a plurality of sipes 33, 43, 53 extending in the tire axial direction are respectively formed on the blocks 32, 42, 52. The sipes 23, 33, 43, and 53 may extend linearly, or may extend in a zigzagging shape.

In the aforementioned pneumatic tire, when a tread pattern with a specified rotation direction is used, the center rib 20 is provided in the center region of the tread portion 1, the plurality of closed grooves 21 are formed on the center rib 20, the closed grooves 21 are inclined with regard to the tire axial direction such that the closed ends thereof face the leading side, the groove walls 21A on the leading side of the closed grooves 21 protrude more outward in the tire axial direction than the groove walls 21B on the trailing side, and the difference between the angle $\theta1$ of the groove walls 21A on the leading side of the closed grooves 21 with regard to the tire axial direction and angle $\theta2$ of the groove walls 21B on the trailing side with regard to the tire axial direction is set within a range of $0° \leq \theta1-\theta2 \leq 5$, and therefore, the center rib 20 exhibits the following behaviors when braking and driving.

Figure 4A:
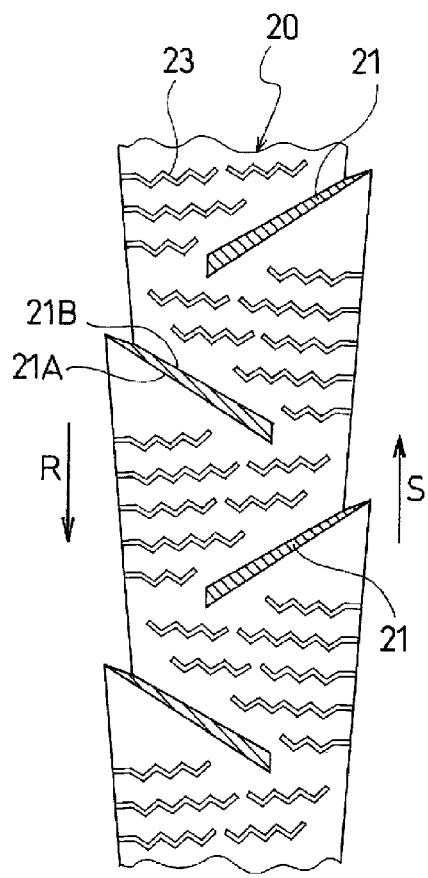
FIG. 4A is a plan view illustrating a condition when driving.
Figure 4B:
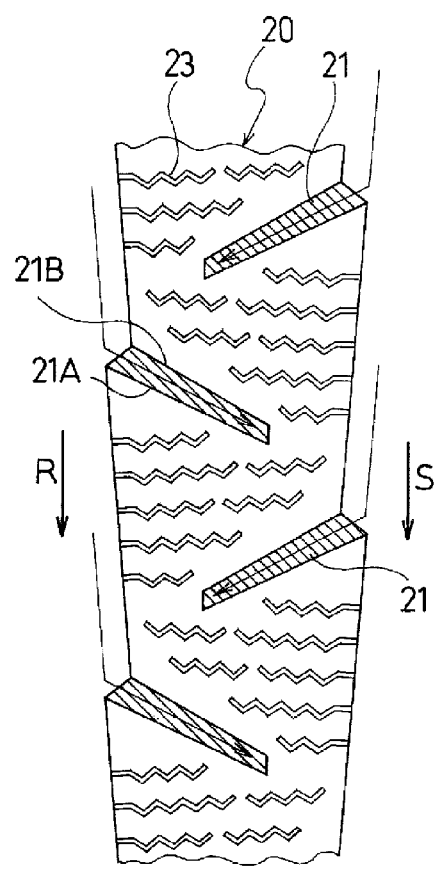
FIG. 4B is a plan view illustrating a condition when braking.

In other words, when driving, as illustrated in FIG. 4A, slippage occurs on a road surface toward a direction S which is opposite from the rotation direction R with regard to the tread portion 1, and the closed grooves 21 close such that a snow column inside the closed grooves 21 is compressed by the slippage occurring between the tread portion 1 and the road surface. In other words, when braking, as illustrated in FIG. 4B, slippage occurs on the road surface in the same direction S as the rotation direction R with regard to the tread portion 1, and the closed grooves 21 open such that a large amount of snow is introduced into the closed grooves 21. Thus, the shear force of a snow column formed inside the closed grooves 21 is increased, and therefore, a driving force and braking force during travel on snow increases due to the snow column shear force, and thus performance on snow can be effectively improved.

Herein, the difference between the angle $\theta1$ of the groove walls 21A on the leading side of the closed grooves 21 with regard to the tire axial direction and angle $\theta2$ of the groove walls 21B on the trailing side with regard to the tire axial direction must be within a range of $0° \leq \theta1-\theta2 \leq 5°$. Thus, the closed grooves 21 easily close when driving, and a sufficient amount of snow is introduced in the closed grooves 21 when braking, and therefore, performance on snow can be effectively improved. When an angle difference ($\theta1-\theta2$) of the groove walls 21A, 21B where the angle $\theta1$ of the groove walls 21A on the leading side of the closed grooves 21 is smaller than the angle $\theta2$ of the groove walls 21B on the trailing side is a negative value, an effect of compressing a snow column inside the closed grooves 21 is reduced when driving, and conversely, when the angle difference ($\theta1-\theta2$) is larger than 5°, an effect of incorporating snow inside the closed grooves 21 is reduced when braking.

In the pneumatic tire, the JIS hardness of tread rubber configuring the tread portion 1 is set within a range of 40 to 60, and more preferably set within a range of 45 to 55. If the JIS hardness of the tread rubber configuring the tread portion 1 is set within the aforementioned range, the tread portion 1 flexibly follows a road surface, and therefore, the tire effectively functions as a snow and ice tire. Furthermore, in the aforementioned pneumatic tire, the snow traction index STI is set at 180 or higher, and more preferably set within a range of 180 to 240. If the snow traction index STI is set within the aforementioned range, the tire effectively functions as a snow and ice tire.

Figure 5:
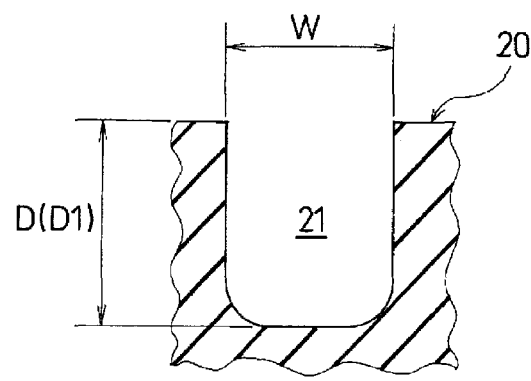
FIG. 5 is a cross-sectional view viewed in the direction of arrow V-V of FIG. 3.
Figure 6:
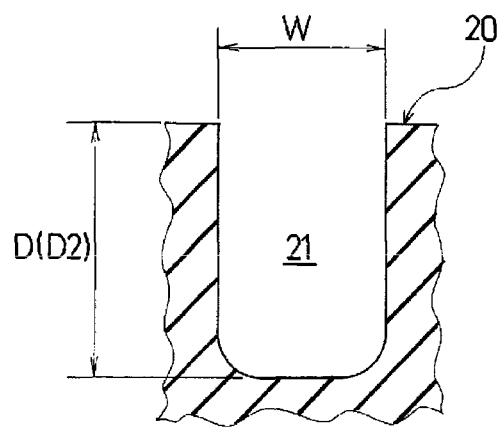
FIG. 6 is a cross-sectional view viewed in the direction of arrow VI-VI of FIG. 3.

In the aforementioned pneumatic tire, a ratio W/D of a groove width W with regard to a groove depth D of the closed grooves 21 is preferably within a range of 0.10 to 0.30, as illustrated in FIG. 5 and FIG. 6. Thus, the closed grooves 21 appropriately deform in a ground contacting condition. As a result, the closed grooves 21 easily close when driving, and a sufficient amount of snow is introduced in the closed grooves 21 when braking, and therefore, performance on snow can be effectively improved. When the ratio W/D is smaller than 0.10, a snow column shear force based on the closed grooves 21 is insufficient, and conversely, when the ratio is larger than 0.30, an effect of compressing snow inside the closed grooves 21 is reduced. Note that if the groove depth D and groove width W of the closed grooves 21 change based on a position of the closed grooves 21 in a longitudinal direction, maximum values thereof are set as the groove depth D and groove width W.

As illustrated in FIG. 3, in the aforementioned pneumatic tire, a protruding amount E of groove walls 21A on the leading side of the closed grooves 21 is preferably within a range of 5% to 15% of a width Wr of the rib 20 in the tire axial direction, and more preferably within a range of 8% to 12%.

Thus, a sufficient amount of snow is introduced in the closed grooves 21 when braking, and therefore, performance on snow can be effectively improved. When the protruding amount E is too small, an effect of incorporating snow into the closed grooves 21 is reduced, and conversely, when the amount is too high, a location where the rigidity of the rib 20 greatly differs is formed, and therefore, abnormal wear may occur. Note that the protruding amount E of the groove walls 21A on the leading side of the closed grooves 21 and the width Wr of the rib 20 in the tire axial direction are both projected dimensions in the tire circumferential direction.

In the aforementioned pneumatic tire, the angle $\theta$ of a center line of the closed grooves 21 with regard to the tire axial direction is preferably within a range of 25° to 65°, as illustrated in FIG. 3. Thus, the closed grooves 21 are sufficiently inclined with regard to the tire axial direction such that snow is easily introduced into the closed grooves 21 when slippage occurs on a road surface when braking, and therefore, performance on snow can be effectively improved. When the angle θ of the closed grooves 21 is smaller than 25°, an effect of introducing snow into the closed groove 21 is reduced, and conversely, when the angle is larger than 65°, a reduction in rigidity of the rib 20 becomes noticeable.

In the aforementioned pneumatic tire, the closed grooves 21 preferably have a structure that gradually deepens toward the closed end thereof, as illustrated in FIG. 5 and FIG. 6. In other words, a groove depth D2 of the closed grooves 21 at a position on a closed end side is preferably relatively larger than a groove depth D1 at a position on the opening end side. Thus, a volume of the closed grooves 21 on the closed end side is relatively increased, and an effect of guiding snow to the closed end side of the closed grooves 21 is increased, and therefore, the snow column shear force can be effectively increased. Note that the groove depth D of the closed grooves 21 is preferably within a range of 7 mm to 14 mm.

In the aforementioned pneumatic tire, a length Wg of the closed grooves 21 in the tire axial direction is preferably within a range of 40% to 80% of the width Wr of the rib 20 in the tire axial direction, and more preferably within a range of 50% to 70%, as illustrated in FIG. 3. Thus, the closed grooves 21 are sufficiently long, and therefore, the snow column shear force based on the closed grooves 21 is sufficiently ensured, and thus performance on snow can be effectively improved. When the length Wg of the closed grooves 21 is too small, the snow column shear force based on the closed grooves 21 is insufficient, and conversely, when the length is too long, a reduction in rigidity of the rib 20 becomes noticeable. Note that the length Wg of the closed grooves 21 in the tire axial direction is a projected dimension in the tire circumferential direction.

In the aforementioned embodiment, a case where the center rib 20 is disposed on the tire equator CL, and the closed grooves 21 are provided with regard to the center rib 20 was described, but in the present technology, the center rib 20 where the closed grooves 21 are formed is preferably at a position separated from the tire equator CL. However, if the closed grooves 21 having the aforementioned structure are provided with regard to the center rib 20 positioned on the tire equator CL, the snow column shear force when braking and driving can be effectively increased.

EXAMPLES

For a pneumatic tire with a tire size of 225/65 R17 102Q, including: an annular-shape tread portion; a pair of sidewall portions; and a pair of bead portions; where a JIS hardness of tread rubber configuring the tread portion is 51, a snow traction index is 200, and a rotation direction is specified; tires of Examples 1 to 8 where a rib positioned between a pair of circumferential grooves and continuous in the tire circumferential direction is demarcated in a center region of the tread portion, a plurality of closed grooves with a first end closing inside the rib and a second end opening in one of the circumferential grooves are formed in the rib, the closed grooves are inclined with regard to a tire axial direction such that the closed end faces a leading side, a groove wall of the closed groove on the leading side protrudes more outward in the tire axial direction than a groove wall on a trailing side, and a difference between an angle of the groove walls on the leading side of the closed grooves with regard to the tire axial direction and an angle of the groove walls on the trailing side with regard to the tire axial direction is within a range of 0°≤θ1-θ2≤5° were prepared as illustrated in FIG. 2.

In Examples 1 to 8, a difference (θ1-θ2) between the angle θ1 of the groove walls on the leading side of the closed grooves and angle θ2 of the groove walls on the trailing side, a ratio (W/D) of a groove width W with regard to a groove depth D of the closed grooves, a ratio (E/Wr×100%) of a protruding amount E of the groove walls on the leading side of the closed grooves with regard to a width Wr of the rib in the tire axial direction, an angle θ of a center line of the closed grooves with regard to the tire axial direction, a ratio (D2/D1) of a groove depth D2 of the closed grooves 21 at a position on a closed end side with regard to a groove depth D1 at a position on an opening end side, and a ratio (Wg/Wr×100%) of a length Wg of the closed grooves in the tire axial direction with regard to the width Wr of the rib in the tire axial direction were set as shown in Table 1.

For comparison, other than the difference (θ1-θ2) of the angle θ1 of the groove walls on the leading side of the closed grooves and angle θ2 of the groove walls on the trailing side was set to −5°, a tire for a Conventional Example having a similar structure as Example 1 was prepared.

The test tires were evaluated for braking performance on snow and driving performance on snow based on the following test methods, and the results thereof are collectively shown in Table 1. The evaluations were conducted under conditions where the test tires were assembled on wheels having a rim size of 17×7J, and mounted on a four-wheel drive vehicle with a 2400 cc engine displacement, and the air pressure after warm-up was set to 220 kPa.

Braking Performance on Snow:

For the test tires, a braking distance from a condition traveling at a speed of 40 km/h on snow to a stopped condition by performing ABS braking was measured. Using reciprocals of measurement values, the evaluation results were expressed as index values with the values of the Conventional Example being defined as 100. Larger index values indicate superior braking performance on snow.

Driving Performance on Snow:

For the test tires, an acceleration test on snow was performed, and the time from a stopped condition to 40 km/h was measured. Using reciprocals of measurement values, the evaluation results were expressed as index values with the values of the Conventional Example being defined as 100. Larger index values indicate superior driving performance on snow.

TABLE 1

|  | Conventional Example | Example 1 | Example 2 | Example 3 | Example 4 | Example 5 | Example 6 | Example 7 | Example 8 |
| --- | --- | --- | --- | --- | --- | --- | --- | --- | --- |
| θ1-θ2 (°) | −5 | 0 | 3 | 5 | 0 | 0 | 0 | 0 | 0 |
| W/D | 0.2 | 0.2 | 0.2 | 0.2 | 0.2 | 0.2 | 0.2 | 0.2 | 0.2 |
| E/Wr × 100% | 5 | 5 | 5 | 5 | 10 | 10 | 10 | 10 | 10 |
| θ (°) | 45 | 45 | 45 | 45 | 45 | 35 | 55 | 45 | 45 |
| D2/D1 | 0.8 | 0.8 | 0.8 | 0.8 | 0.8 | 0.8 | 0.8 | 1.2 | 1.2 |

TABLE 1-continued

|  | Conventional Example | Example 1 | Example 2 | Example 3 | Example 4 | Example 5 | Example 6 | Example 7 | Example 8 |
|---|---|---|---|---|---|---|---|---|---|
| Wg/Wr × 100% | 15 | 15 | 15 | 15 | 15 | 15 | 15 | 15 | 60 |
| Braking performance on snow (index) | 100 | 109 | 112 | 109 | 115 | 112 | 112 | 119 | 121 |
| Driving performance on snow (index) | 100 | 108 | 111 | 108 | 112 | 111 | 111 | 115 | 117 |

As can be seen from Table 1, the tires of Examples 1 to 8 had both superior braking performance on snow and driving performance on snow as compared to the Conventional Example.

The invention claimed is:

1. A pneumatic tire, comprising:
an annular-shape tread portion extending in a tire circumferential direction;
a pair of sidewall portions disposed on both sides of the tread portion; and
a pair of bead portions disposed on an inner side in a tire radial direction of the sidewall portions;
JIS hardness of tread rubber configuring the tread portion being within a range of 40 to 60, snow traction index based on grooves and sipes formed on the tread portion being 180 or higher, and a rotation direction being specified; wherein
a rib positioned between a pair of circumferential grooves and substantially continuous in the tire circumferential direction is demarcated in a center region of the tread portion, a plurality of closed grooves is provided in the tread portion, each of the plurality of closed grooves has a first end and a second end opposite to the first end, each first end of each of all the closed grooves is closed inside the rib and the second end opens in one of the circumferential grooves, the closed grooves are inclined with regard to a tire axial direction such that closed ends thereof face a leading side, a groove wall of each closed groove on the leading side protrudes more outward in the tire axial direction than a groove wall on a trailing side, each closed groove extends across a tire equator, and a difference between an angle θ1 of the groove walls on the leading side of the closed grooves with regard to the tire axial direction and an angle θ2 of the groove walls on the trailing side with regard to the tire axial direction is within a range of 0°<θ1-θ2≤5°, wherein the groove wall on the leading side and the groove wall on the trailing side gradually approach each other toward an opening end side.

2. A pneumatic tire, comprising:
an annular-shape tread portion extending in a tire circumferential direction;
a pair of sidewall portions disposed on both sides of the tread portion; and
a pair of bead portions disposed on an inner side in a tire radial direction of the sidewall portions;
JIS hardness of tread rubber configuring the tread portion being within a range of 40 to 60, snow traction index based on grooves and sipes formed on the tread portion being 180 or higher, and a rotation direction being specified; wherein
a rib positioned between a pair of circumferential grooves and substantially continuous in the tire circumferential direction is demarcated in a center region of the tread portion, a plurality of closed grooves with a first end closed inside the rib and a second end opening in one of the circumferential grooves are formed in the rib, the closed grooves are straight and inclined with regard to a tire axial direction such that closed ends thereof face a leading side, a groove wall of each closed groove on the leading side protrudes more outward in the tire axial direction than a groove wall on a trailing side, each closed groove extends across a tire equator, and a difference between an angle θ1 of the groove walls on the leading side of the closed grooves with regard to the tire axial direction and an angle θ2 of the groove walls on the trailing side with regard to the tire axial direction is within a range of 0°<θ1-θ2≤5°, wherein the groove wall on the leading side and the groove wall on the trailing side gradually approach each other toward an opening end side.

3. The pneumatic tire according to claim 2, wherein a ratio W/D of a groove width W with regard to a groove depth D of each closed groove is within a range of 0.10 to 0.30.

4. The pneumatic tire according to claim 3, wherein a protruding amount E of the groove wall on the leading side of each closed groove is within a range of 5% to 15% of a width Wr in the tire axial direction of the rib.

5. The pneumatic tire according to claim 4, wherein an angle θ of a center line of each closed groove with regard to the tire axial direction is within a range of 25° to 65°.

6. The pneumatic tire according to claim 5, wherein each closed groove has a structure that gradually deepens toward the closed end thereof.

7. The pneumatic tire according to claim 6, wherein a length Wg of each closed groove in the tire axial direction is 40% to 80% of the width Wr of the rib in the tire axial direction.

8. The pneumatic tire according to claim 2, wherein a protruding amount E of the groove wall on the leading side of each closed groove is within a range of 5% to 15% of a width Wr in the tire axial direction of the rib.

9. The pneumatic tire according to claim 2, wherein an angle θ of a center line of each closed groove with regard to the tire axial direction is within a range of 25° to 65°.

10. The pneumatic tire according to claim 2, wherein each closed groove has a structure that gradually deepens toward the closed end thereof.

11. The pneumatic tire according to claim 2, wherein a length Wg of each closed groove in the tire axial direction is 40% to 80% of the width Wr of the rib in the tire axial direction.

* * * * *